(No Model.) 2 Sheets—Sheet 1.
J. A. GRAHAM.
BUNDLE CARRIER AND DROPPER FOR HARVESTERS AND GRAIN BINDERS.
No. 417,418. Patented Dec. 17, 1889.
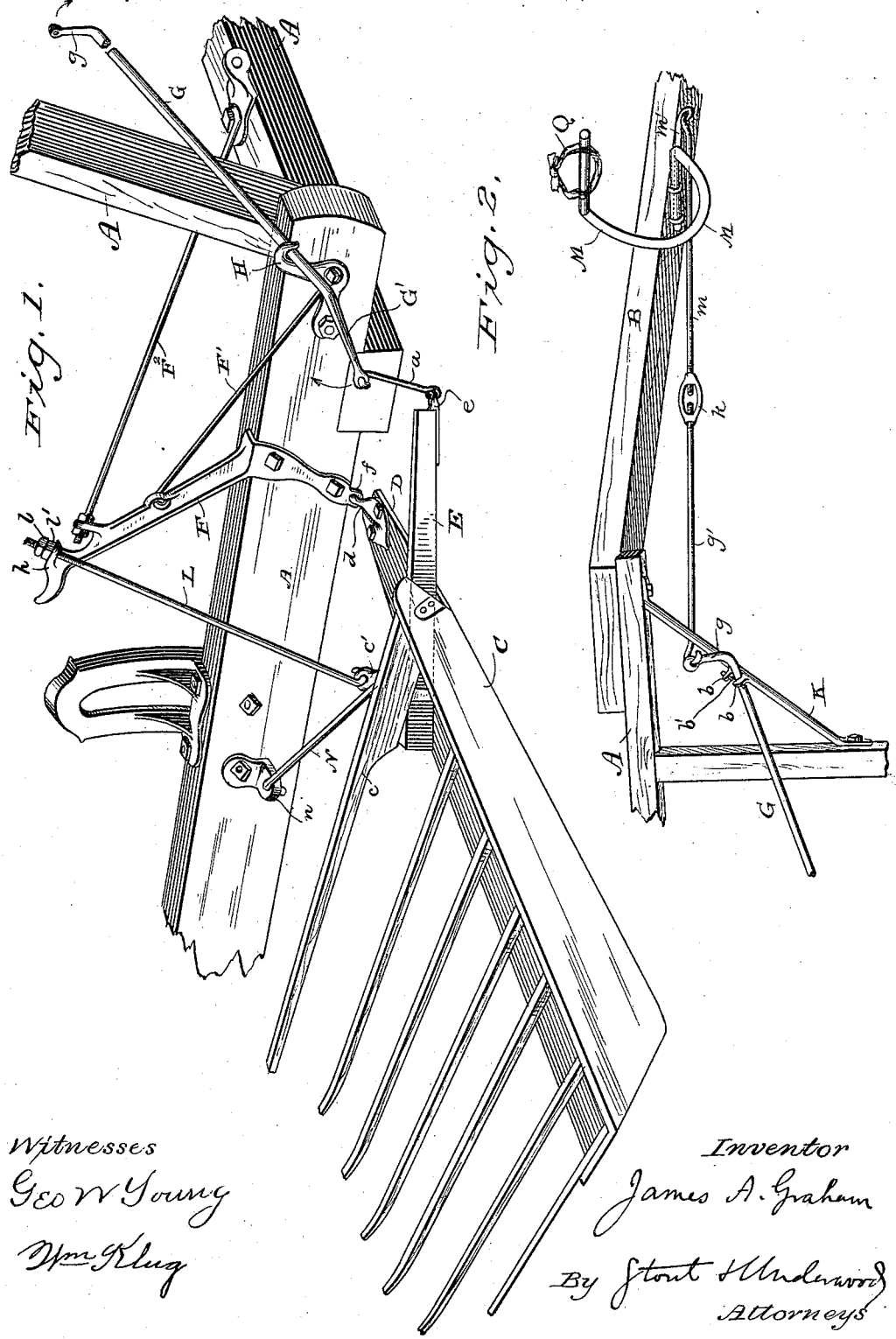
Witnesses
Geo W Young
Wm Klug
Inventor
James A. Graham
By Stout & Underwood
Attorneys (No Model.) 2 Sheets—Sheet 2.
J. A. GRAHAM.
BUNDLE CARRIER AND DROPPER FOR HARVESTERS AND GRAIN BINDERS.
No. 417,418. Patented Dec. 17, 1889.
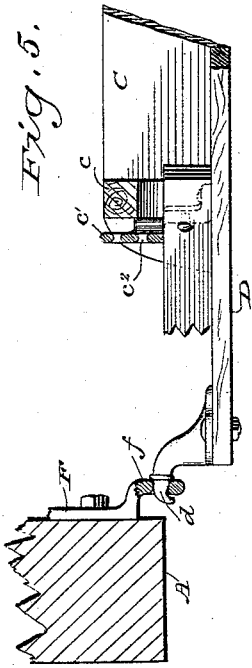
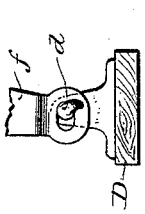
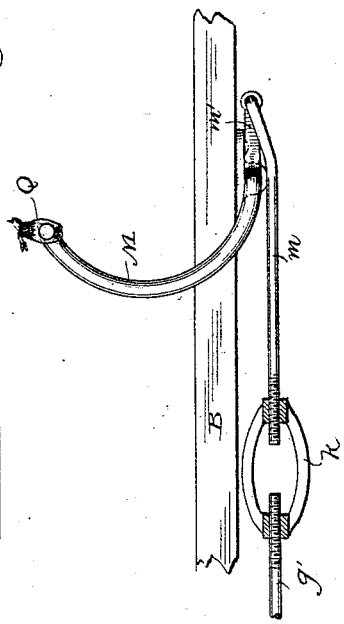
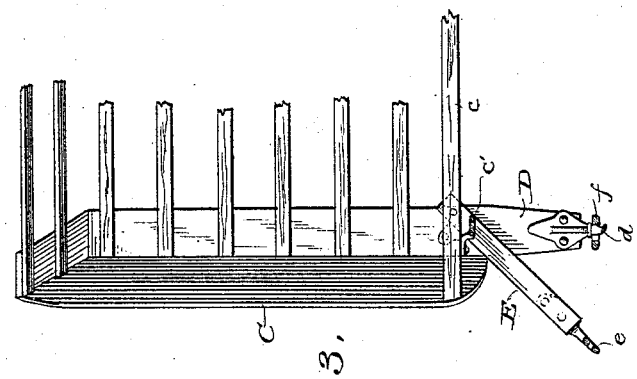
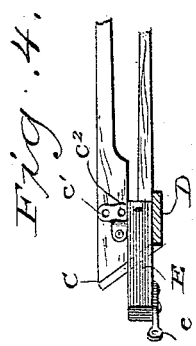
Witnesses
Geo W Young
Wm Klug
Inventor
James A. Graham
By Stout & Underwood
Attorneys

UNITED STATES PATENT OFFICE.

JAMES A. GRAHAM, OF MILWAUKEE, WISCONSIN, ASSIGNOR TO THE MILWAUKEE HARVESTER COMPANY, OF SAME PLACE.

BUNDLE CARRIER AND DROPPER FOR HARVESTERS AND GRAIN-BINDERS.

SPECIFICATION forming part of Letters Patent No. 417,418, dated December 17, 1889.

Application filed December 27, 1887. Serial No. 258,973. (No model.)

*To all whom it may concern:*

Be it known that I, JAMES A. GRAHAM, of Milwaukee, in the county of Milwaukee, and in the State of Wisconsin, have invented certain new and useful Improvements in Bundle Carriers and Droppers for Harvesters and Grain-Binders; and I do hereby declare that the following is a full, clear, and exact description thereof.

My invention relates to bundle carriers and droppers for harvesters and grain-binders, and will be fully described hereinafter.

In the drawings, Figure 1 is a perspective view of a portion of a harvester with my device attached. Fig. 2 is a detached view of a portion of my device, showing the seat-plank, foot-crank, and attachments; and Fig. 7 is another view of said parts. Figs. 3, 4, 5, and 6 are details illustrating portions of the bundle-carrier and attachments.

A is the harvester-frame, and B the seat-plank.

C is the bundle-carrier, of the form shown in Figs. 1, 3, and 5, having a suitable frame and projecting fingers. The said carrier-frame consists of a front board, an end board, and a bottom board, which latter continues beyond the inner end of the front board, so as to form practically an arm D, that projects from the front end of the carrier at right angles to its inner finger c, and E is an arm that is secured to arm D and projects obliquely forward therefrom, its forward end being fitted with an eyebolt e. A metal ear c' is secured to finger c near its forward end, and a hook d is secured to the end of arm D, and by this hook d the arm D is loosely suspended from the lower end f of a bracket F, that is secured to the harvester-frame A on the side adjacent to the bundle-carrier, and is horizontally slotted to receive the hook d, as shown in Figs. 3 and 6, while to the eye e of arm E is secured the lower hook of a link a, that is suspended from the lower end G' of a rocking lever G, one bearing of which is in a hook H, that is secured to the forward part of the harvester-frame, the other being between a pair of lugs b b (where it is confined by a pin b') on a stay-brace K for the seat-plank B, as shown in Fig. 2. The upper end of lever G is formed with a crank-arm g, through a hole in which one end of a draw-rod g' is hooked, and the other end of this draw-rod is connected by a turn-buckle k and link m with an arm m' of a foot-crank M, that is journaled in bearings on the under side of the seat-plank B.

The bracket F is braced to the forward part of the harvester-frame by stays F' and F$^2$, and through a lug h in its upper end a rod L is passed down, and its lower end, which is hooked, is caught in a hole in the upper end of ear c'. The upper end of rod L is screw-threaded to receive nuts l l', and by screwing these nuts in or out the rod L may be drawn up or dropped to bodily lift or drop the bundle-carrier to the horizontal plane desired.

The hook d and slot in the lower end f of bracket F form a swivel-joint, which serves as a fulcrum-point for the raising and lowering of the carrier by the rod L, and also as a fulcrum-point for the dumping of said carrier, as hereinafter described, and a brace N, that extends from a lug n on the harvester-frame on the side adjacent to the carrier to a lower hole c$^2$ in the ear c', serves with the link a and lever G, to maintain the body of the carrier in the line of draft of the harvester, the brace N being to prevent the rear end of the carrier from swinging toward the harvester-frame, and the link a preventing the front end of the carrier from rising or falling, and thus keeping said carrier in a balanced condition until it is loaded.

In setting for use the carrier C is hung to the harvester by inserting the hook d in the slot in the lower end of the bracket F. The hook in the lower end of rod L is caught in the upper hole in the ear c', the brace N is hooked to said ear c' at one end and lug n at the other, and to the eye e of arm E is hooked the lower end of link a. Now the carrier C is set at a proper or desired height by screwing the nuts l l' in or out, so as to shorten or lengthen the rod L, and the pitch or incline of the fingers is regulated by turning the buckle k to the right or left. If it is turned to the right, so as to draw the rods g' and m toward each other, the rod g', by drawing upon crank-arm g, will rock the lever G and cause its lower cranked arm G' to drop, and thus depress the arm E and tilt the fingers of the carrier upward; but if the buckle $k$ is turned in the other direction the cranked arm G' will be lifted and the points of the fingers will be dropped nearer the ground.

When a harvester fitted with my device is at work, the bundles as they are bound drop from the binder-table into the carrier, and as the carrier is filled the driver lifts his foot in the stirrup Q of the foot-crank M, and thus throws the arm $m'$ below the dead-center and rocks the lever G, causing its cranked arm G' to lift upon arm E and tilt the carrier out of balance, so that the weight of the bundles will carry the points of the fingers down in the stubble, which, clinging to the bundles, will draw them off before another bundle has been dropped. The carrier is then righted by pressing the foot on crank M, and thus lifting the arm $m'$ to a dead-center as the cranked arm G' lifts the arm E. The bracket F rises from near the forward end of the side beam of the harvester-frame that is on the stubble side, and the rod L projects from the upper end of this bracket to an ear $c'$ on the carrier C. The brace N extends from the same ear $c'$ to a lug on the same side beam of the harvester-frame back of the said bracket, while the stay $F^2$ projects from a lug on the bracket F, just beneath the point of connection of the said rod L and said bracket, to the lower front beam of the harvester-frame to which the lower end of said stay is secured, and the stay F' projects from the said bracket F, at a point beneath the point of connection of the stay $F^2$ and said bracket, to one of the bolts which secure the hook H to the forward part of the said side beam of the harvester-frame.

Having thus described my invention, what I claim as new, and desire to secure by Letters Patent, is—

1. The combination, with a harvester, of a sheaf-carrier having an arm projecting from it at right angles to its fingers and connected to the harvester by a swivel-joint and an arm projecting obliquely to the last-named arm forward from its corner adjacent to the front of the frame, an adjustable rod for supporting said carrier, extending from a bracket on the side beam of the harvester to a point on the carrier on a line with but outside of said swivel-joint connection, a rocking lever linked to the outer end of said oblique arm, a foot-crank journaled to the seat-plank, and rods connecting the foot-crank with the rocking lever, substantially as described.

2. The combination, with the sheaf-carrier and swivel-joint connecting it with the harvester, of an arm projecting obliquely to the front of said carrier-frame from its forward inner corner, a rocking lever linked to said arm, an adjustable rod for supporting said carrier, extending from a bracket on the side beam of the harvester to a point on the carrier on a line with but outside of said swivel-joint connection, a foot-crank, and an adjustable connection between the upper arm of the rocking lever and an arm of the foot-crank, whereby the pitch of the carrier-fingers is regulated, substantially as described.

3. The combination, with the sheaf-carrier and its arm having a swivel-joint connection with the harvester, of the harvester-frame side beam, a bracket rising therefrom, and an adjustable suspending-rod connecting said bracket and carrier at a point on said carrier on a line with but outside of said swivel-joint connection for regulating the height of the carrier, substantially as described.

4. The combination, with the harvester, of the sheaf-carrier connected thereto by a swivel-joint, a bracket rising from the side beam of the harvester-frame, a suspending-rod extending from said bracket to said carrier, a brace extending from said carrier to a point on said side beam back of said bracket, an arm projecting from said carrier obliquely to the front of its frame, a seat-plank supported on said harvester, a foot-crank having an inturned arm journaled to said seat-plank, and a rocking lever connected by jointed rods or links to said inturned arm and linked to the end of said oblique arm, said rocking lever having suitable bearings at the front end of the said side beam and beneath the said seat-plank, and means for regulating the length of its jointed-link connection and thereby adjusting the pitch or incline of the carrier, substantially as set forth.

In testimony that I claim the foregoing I have hereunto set my hand, at Milwaukee, in the county of Milwaukee and State of Wisconsin, in the presence of two witnesses.

JAMES A. GRAHAM.

Witnesses:
CHARLES W. HAMILTON,
J. W. LATIMER.